(12) United States Patent
Hamid

(10) Patent No.: US 7,111,174 B2
(45) Date of Patent: Sep. 19, 2006

(54) METHOD AND SYSTEM FOR PROVIDING ACCESS TO SECURE ENTITY OR SERVICE BY A SUBSET OF N PERSONS OF M DESIGNATED PERSONS

(75) Inventor: Larry Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 777 days.

(21) Appl. No.: 09/940,795

(22) Filed: Aug. 29, 2001

(65) Prior Publication Data

US 2003/0046552 A1    Mar. 6, 2003

(51) Int. Cl.
H04L 9/32 (2006.01)
G06K 9/00 (2006.01)

(52) U.S. Cl. .................. 713/186; 382/115; 340/5.52; 340/5.82; 726/28; 726/4; 726/17

(58) Field of Classification Search ................ 713/186, 713/182; 380/277, 286; 382/115, 124; 340/5.52, 340/5.82; 726/28, 17, 19, 20, 4, 5, 7, 9
See application file for complete search history.

(56) References Cited

U.S. PATENT DOCUMENTS 5,456,256 A * 10/1995 Schneider et al. .......... 600/445

(Continued)

FOREIGN PATENT DOCUMENTS

DE      198 37 642 C1    11/1999

(Continued)

OTHER PUBLICATIONS

Schneier, Bruce. Applied Cryptography, Second Edition: Protocols, Algorithms, and Source Code in C. John Wiley & Sons, Inc. 1996. pp. 71-73, 528-531.*

(Continued)

Primary Examiner—Emmanuel L. Moise
Assistant Examiner—Zachary A. Davis
(74) Attorney, Agent, or Firm—Woodcock Washburn LLP

(57) ABSTRACT

A security system for securing an entity or a service from indiscriminate access and a method for operating the same is disclosed. Each designated person of M designated persons is provided with a portable biometric device. Biometric data in dependence upon a biometric characteristic of each of the M designated persons is stored in memory of the respective portable biometric device. Biometric information representative of a biometric characteristic of each of a subset of 1<N<M persons is captured in response to each of the N persons presenting said information to the respective portable biometric device. The biometric information is encoded and biometric data in dependence thereupon is provided to the processor of each respective portable biometric device. Using the processor of each respective portable biometric device the captured biometric data is then compared with the stored biometric data to produce a comparison result. If the comparison result is indicative of a match an authorization signal is transmitted from each of the respective portable biometric devices to a receiving port of the security system. Upon receipt of the authorization signal a processor of the locking mechanism determines access privileges to the secure entity or service in dependence upon the authorization signals it received from the respective portable biometric devices of the subset of N persons. If an authorization signal of the subset of N persons is missing, the security system denies access to the secure entity or service.

16 Claims, 3 Drawing Sheets

U.S. PATENT DOCUMENTS

| | | |
|---|---|---|
| 5,629,508 A | 5/1997 | Findley, Jr. et al. |
| 5,933,515 A | 8/1999 | Pu et al. |
| 6,111,977 A * | 8/2000 | Scott et al. ................ 382/124 |
| 6,542,608 B1 * | 4/2003 | Scheidt et al. ................ 380/44 |
| 6,697,947 B1 * | 2/2004 | Matyas et al. .............. 713/182 |

FOREIGN PATENT DOCUMENTS

| | | |
|---|---|---|
| EP | 0 712 983 A2 | 5/1996 |
| EP | 0 949 578 A2 | 10/1999 |
| WO | WO 96/30875 A1 | 10/1996 |
| WO | WO 99/56429 A1 | 11/1999 |

OTHER PUBLICATIONS

Sandhu, R., "Transaction Control Expressions for Separation of Duties," Fourth Aerospace Computer Security Applications Conference (IEEE), Dec. 12-16, 1988. pp. 282-286.*

* cited by examiner

METHOD AND SYSTEM FOR PROVIDING ACCESS TO SECURE ENTITY OR SERVICE BY A SUBSET OF N PERSONS OF M DESIGNATED PERSONS

FIELD OF THE INVENTION

This invention relates generally to automated security for permitting access to a service or a predefined area by designated persons and more particularly relates to a biometric security system for providing limited access to a secure entity or service by a subset of N persons of M designated persons.

BACKGROUND OF THE INVENTION

Access to most any secure entity or service is commonly limited by use of a security system. The use of security systems is generally well known. Their use is increasing with greater availability of digital electronic components at a relatively low cost. Such systems are known for securing buildings, banks, automobiles, computers and many other devices.

For example, U.S. Pat. No. 4,951,249 discloses a computer security system, which protects computer software from unauthorized access by requiring the user to supply a name and a password during the operating system loading procedure ("boot-up") of a personal computer (PC). This PC security system, utilizing password protection, is typical of many systems that are currently available. Password protection requires a user's name and a password associated with that user's name. Only once an associated password is detected for a valid user's name does the PC complete the boot-up routine. Though passwords may be useful in some instances, they are inadequate in many respects. For example, an unauthorized skilled user with a correct password in hand, can gain entry to such a processor based system. Yet another undesirable feature of the foregoing system is that passwords on occasion are forgotten; and furthermore, and more importantly, passwords have been known to be decrypted.

As of late one of the most ubiquitous electronic components is the digital processor. Multi-purpose and dedicated processors of various types control devices ranging from bank machines, to cash registers and automobiles. With ever-increasing use of these processor-based devices, there is greater concern that unauthorized use will become more prevalent. Thus, the verification and/or authentication of authorized users of processor based systems is a burgeoning industry.

Alarms and security systems to warn of unauthorized use of automobiles and other processor controlled systems are available, however, these security systems have been known to be circumvented. Unfortunately, many commercially available solutions aimed at preventing theft or unauthorized use of automobiles have also been circumvented. As of late, initiatives have been underway in the security industry, to provide biometric identification systems to validate users of electronic and other systems that are to have restricted access. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterization and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvilc (Gyergyek, "Minutaie Based Fingerprint Regstration," IEEE Pattern Recognition, pp 1380, 1980;

J. A. Ratkovic, F. W. Blackwell, and H. H. Bailey, "Concepts for a Next Generation Automated Fingerprint System." Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, *An Automated Fingerprint Identification System*, NBS special publication, U.S. Department of Commerce/National Bureau of Standards, ISSN 0083-1883; no. 500-89, 1982;

Moenssens, Andre A., Fingerprint Techniques, Chilton Book Co., 1971; and,

Wegstein and J. F. Rafferty, *The LX39 Latent Fingerprint Matcher*, NBS special publication, U.S. Department of Commerce/National Bureau of Standards; no. 500-36, 1978.

In the field of digital and analog communications, wireless devices are becoming more commonplace. Inexpensive computer systems are currently commercially available wherein printers communicate with computers, which in turn communicate with other computers via infrared transmitters and receivers. Other devices, using other optical communication systems, such as data transmitting/receiving wrist watches are now available in department stores at substantially affordable prices; these wrist watches include processors and software for communication with a computer and for downloading and uploading small amounts of data as required.

Biometric security identification systems, such as fingerprint scanning and input devices are becoming more commonplace as the need to validate authorized users of computers, databases, and secure spaces grows. As computers become more miniaturized, so too are other communication and security devices decreasing in size. One of the more important reasons, however, to miniaturize electronic devices is to lessen the burden of porting them.

One biometric security identification system provides each user with a hand-held portable fingerprint recognition and transmission device, for example, as disclosed in U.S. Pat. No. 6,111,977 to Scott et al. Their device includes a fingeprint scanner that encodes a fingerprint and sends the encoded fingerprint, via an infrared or a radio frequency transmitter, to a receiver in the secure item, facility or area. It is nonetheless necessary to have a central computer that analyzes the encoded fingerprint to allow recognition and authorization of an individual.

Generally, present electronic security systems are very inflexible in their functionality providing either full access to an authorized user or denying access if user authorization fails. It would be advantageous to have a handheld biometric identification device allowing only access to a secure entity or service if a subset of $1<N<M$ persons of M designated persons is present. For example, 10 bank employees are allowed to access the bank vault, but only in groups of 3 employees for security reasons. Other examples would be the operation of a vehicle, access to hazardous areas or materials, computer systems and databases.

It is an object of the invention to use the progress in miniaturization of processors and biometric sensors for providing a biometric security system allowing only access to a secure entity or service if a subset of $1<N<M$ persons of M designated persons is present.

It is a further object of the invention to provide a method of expanding the flexibility of biometric identification systems.

SUMMARY OF THE INVENTION

In accordance with the present invention there is provided a method for providing access to a secure entity or service by M designated persons having only limited access privileges comprising the steps of:

storing biometric data in dependence upon a biometric characteristic of each of the M designated persons;

capturing biometric information representative of a biometric characteristic of each of N persons and providing biometric data in dependence thereupon, with $1<N<M$ being a subset of the M designated persons;

comparing the captured biometric data of each of the N persons with the stored biometric data to produce N comparison results; and, if the N comparison results are indicative of the N persons each being one of the M designated persons and thereby forming a subset, determining access privileges to the secure entity or service in dependence upon the subset.

In accordance with the present invention there is further provided a method for providing access to a secure entity or service by M designated persons having only limited access privileges comprising the steps of:

providing each designated person of the M designated persons with a portable biometric device operable to capture biometric information presented thereto;

assigning a biometric characteristic of each of the M designated persons to a respective portable biometric device and storing biometric data in the respective portable biometric device in dependence upon the biometric characteristic;

capturing biometric information representative of a biometric characteristic of each of N persons in response to each of the N persons presenting said information to the respective portable biometric device and providing biometric data in dependence thereupon, with $1<N<M$ being a subset of the M designated persons;

comparing the captured biometric data with biometric data stored in each of the respective portable biometric devices to produce a comparison result;

if the comparison result is indicative of the N persons each being one of the M designated persons, transmitting an authorization signal from each of the respective portable biometric devices to a receiving port of the secure entity or service; and, determining access privileges to the secure entity or service in dependence upon the authorization signals received from the respective portable biometric devices of the subset of N persons.

In accordance with the present invention there is yet further provided a method for providing access to a secure entity or service by M designated persons having only limited access privileges comprising the steps of:

storing biometric data in dependence upon a biometric characteristic of a plurality of persons of the M designated persons in at least a portable biometric device;

capturing biometric information representative of a biometric characteristic of each of N persons in response to each of the N persons presenting said information to one of the at least a portable biometric device and providing biometric data in dependence thereupon, with $1<N<M$ being a subset of the M designated persons;

comparing the captured biometric data of each of the N persons with the stored biometric data to produce N comparison results;

if a comparison result is indicative of one of the N persons each being one of the M designated persons, transmitting an authorization signal from the at least a portable biometric device to a receiving port of the secure entity or service; and, determining access privileges to the secure entity or service in dependence upon the authorization signals of the subset of N persons received from the at least a portable biometric device.

In accordance with an aspect of the present invention there is provided a security system for securing an entity or a service from indiscriminate access and for providing access to a subset of N persons of M designated persons comprising:

at least a portable biometric device, the device comprising:

a biometric sensor for capturing biometric information representative of a biometric characteristic in response to a person presenting said information to the biometric sensor;

an encoder for digitally encoding the captured biometric information and providing biometric data in dependence thereupon;

memory for storing biometric data of at least one of the M designated persons;

a processor for comparing the captured biometric data with stored biometric data of a designated person to produce a comparison result, and if the comparison result is indicative of a match for providing an authorization signal; and, a transmitter for transmitting the authorization signal;

at least a port for receiving authorization signals of the subset of 1<N<M persons from the at least a portable biometric device; and, a processor for determining access privileges to the secured entity or service in dependence upon the authorization signals of the subset of 1<N<M persons.

BRIEF DESCRIPTION OF FIGURES

Exemplary embodiments of the invention will now be described in conjunction with the following drawings, in which.

DETAILED DESCRIPTION OF PREFERRED EMBODIMENTS

Figure 1:
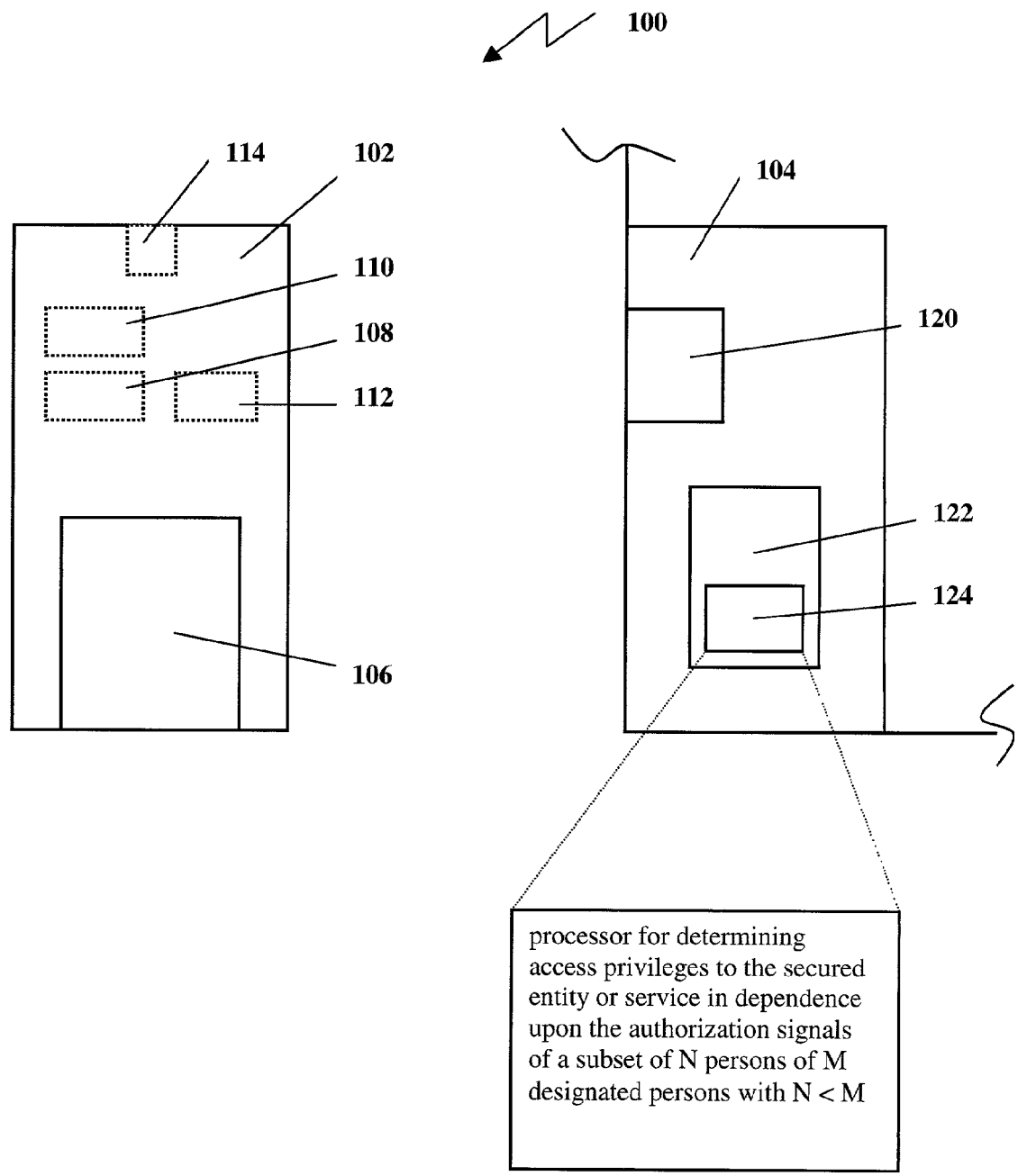
FIG. 1 is a simplified block diagram illustrating a biometric security system according to the invention.

FIG. 1 illustrates the block diagram of a biometric security system 100 for securing an entity or service from indiscriminate access according to the invention. The system 100 comprises at least a portable biometric device 102 and at least a receiving module 104 connected over a transmission channel. For simplicity, only one portable biometric device 102 and one receiving module 104 is shown in FIG. 1, but it is obvious that the invention is not limited thereto. Preferably, the system comprises a plurality of portable biometric devices 102, one for each person of M designated persons of the biometric security system 100. The portable biometric device 102 comprises a biometric sensor 106 for capturing biometric information representative of a biometric characteristic in response to a person presenting said information. In a preferred embodiment the biometric sensor 106 comprises a capacitive fingerprint imager for its compact design, but obviously the invention is not limited thereto. An encoder 108 digitizes or otherwise converts the analog signal into a signal format, which provides an encoded description of the biometric characteristic, suitable for processing. A processor 110 compares the captured biometric data with biometric data of an authorized person stored in memory 112 to produce a comparison result. Preferably, the memory 112 is a non-volatile memory. If the comparison result is indicative of a match an authorization signal is provided to a transmitter 114 for transmitting the signal to a port 120 of the receiving module 104. A locking mechanism 122 comprising a processor 124 at the receiving module 104 then provides access to the secure entity or service in dependence upon the received authorization signals. The processor 124 determines access privileges to the secured entity or service in dependence upon the authorization signals received from a subset of N persons of the M designated persons, with 1<N<M.

Optionally, the locking mechanism 122 comprises memory for storing various predetermined levels of access privileges for different predetermined subsets of persons of the M designated persons.

In a preferred embodiment the processor 124 is a central processor of the secure entity or service connected to a plurality of ports and connected to a plurality of locking mechanisms. Therefore, security is enhanced by having the signal processing and, optionally, the storage of access privileges located in one secure location only accessible to authorized personnel such as a network administrator.

The portable biometric device 102 can be manufactured as a small handheld device such as a remote control, a watch, or a pendant comprising a transmitter 114 for wireless transmission such as infrared or radio frequency transmission. Alternatively, the portable biometric device 102 comprises a smart card, wherein the transmitter 114 is to be interfaced with the port 120 of the receiving module 104. In one embodiment a portable biometric device 102 for each of the M designated persons is provided. In memory of each portable biometric device 102 biometric data representative of a biometric characteristic of one respective person of the M designated persons is stored. This allows use of the portable biometric device 102 by only one person. Alternatively, the biometric information of a plurality of persons is stored in one portable biometric device 102. For example, each person of a subset has a portable biometric device 102 with the biometric data representative of a biometric characteristic of all N persons of the subset stored in memory. This allows use of a portable biometric device 102 by more than one person, for example, if one person of the subset has forgotten his portable biometric device 102.

Optionally, for each designated person or groups of designated persons a different authorization signal is provided. This is advantageous if the security system has various levels of access privileges for different subsets of persons of the M designated persons.

Further optionally, the authorization signals of the N persons of a subset is received at different ports 120. For example, a driver and an assistant driver of a plurality of drivers of an armored vehicle are enabled to access the vehicle only together, each authorization signal from a respective portable biometric device is received by a receiving module on either side of the vehicle.

Figure 2:
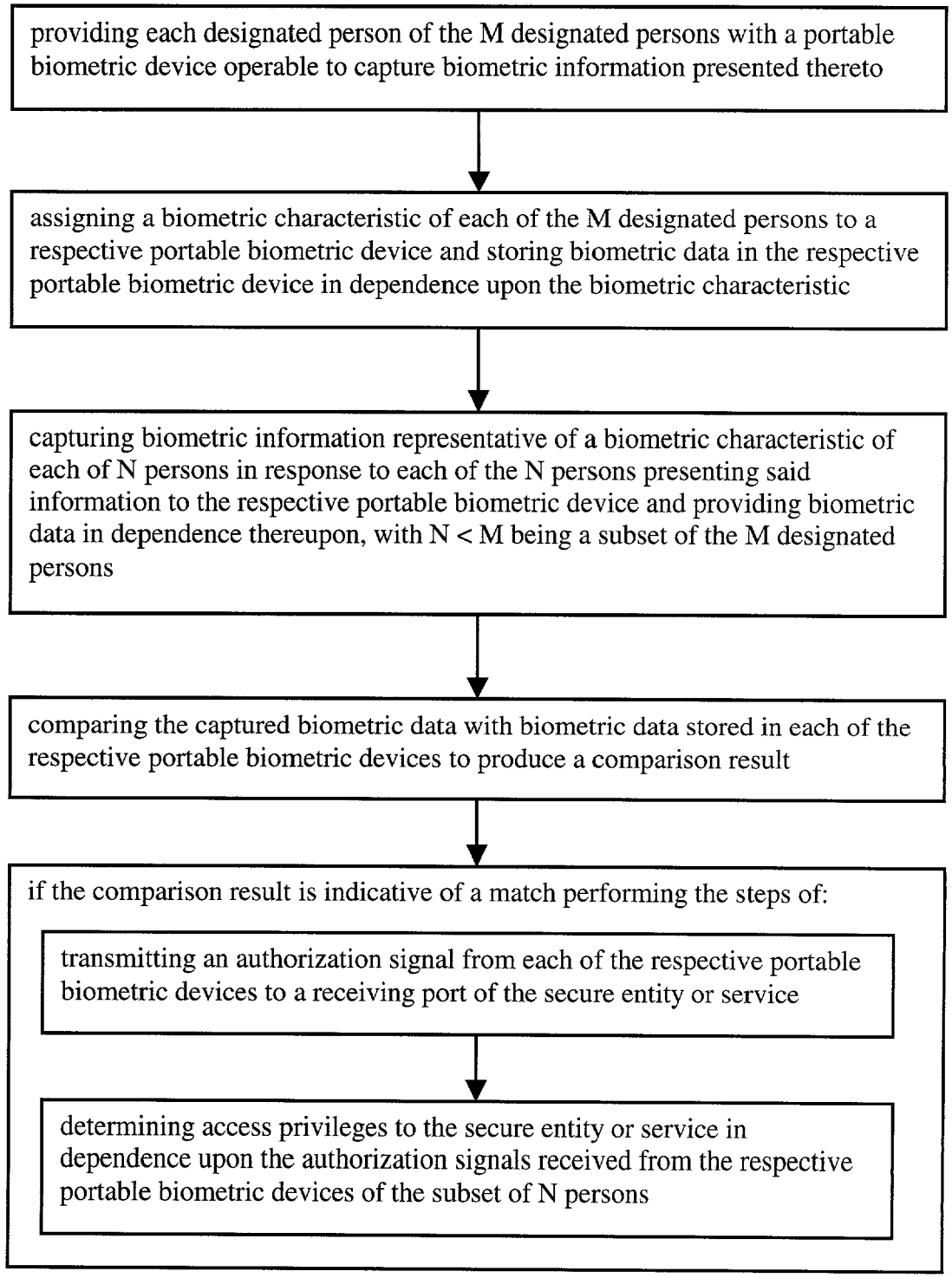
FIG. 2 is a simplified flow diagram illustrating a method of operation according to the invention of the biometric security system shown in FIG. 1; and, FIG. 3 is a simplified flow diagram illustrating another method of operation according to the invention of the biometric security system shown in FIG. 1.

The flow diagram in FIG. 2 illustrates a method of operation according to the invention of the portable biometric devices 102 in conjunction with the receiving modules 104. Each designated person of the M designated persons is provided with a portable biometric device. Biometric data in dependence upon a biometric characteristic such as a fingerprint of each of the M designated persons is stored in memory of the respective portable biometric device. The portable biometric device is preauthorized for use with a particular security system and personalized for use by a particular person. Prior to operation an administrator initializes the portable biometric device with the assistance of either a central computer or a personal computer. Alternatively, a first user of the portable biometric device providing biometric information to the sensor after fabrication is designated as authorized user and biometric data in dependence upon the captured biometric characteristic are stored in memory. A following function block starts the process in response, for example, to a touch of a person's digit to a fingerprint imager. Biometric information representative of a biometric characteristic of each of a subset of 1<N<M persons is captured in response to each of the N persons presenting said information to the respective portable biometric device. The biometric information is encoded and biometric data in dependence thereupon is provided to the processor of each respective portable biometric device. Using the processor of each respective portable biometric device the captured biometric data is then compared with the stored biometric data to produce a comparison result. If the comparison result is indicative of a match an authorization signal is transmitted from each of the respective portable biometric devices to a receiving port of the security system. Upon receipt of the authorization signal a processor of the locking mechanism determines access privileges to the secure entity or service in dependence upon the authorization signals it received from the respective portable biometric devices of the subset of N persons. If an authorization signal of the subset of N persons is missing, the security system denies access to the secure entity or service.

A subset comprises any set of an arbitrary but predetermined number of at least two persons but less than the number of all designated persons. Generally, a subset will be one of a plurality of predetermined subsets, wherein each of the plurality of subsets comprises a different combination of the M designated persons. Furthermore, different subsets comprise a different number of persons combined in the subset. Optionally, different subsets of the plurality of subsets have different access privileges to the secure entity or service.

Preferably, different authorization signals associated with different persons are provided. This accommodates more flexibility in defining various access privileges for different subsets of the M designated persons. In dependence upon the received N authorization signals the processor of the locking mechanism determines which of a plurality of predefined subsets of persons is requiring access to the secure entity or service and provides access according to preset access privileges associated with the determined subset. Preset access privileges comprise, for example, a time limitation allowing access only at certain times, functional limitations, a combination of both, or varying of the functional limitations with time of access.

For example, 10 employees of a branch of a bank are allowed to access the bank vault, but for security reasons they are allowed to enter only in subsets of at least 3 persons. Here, each of the subset of 3 bank employees provides a fingerprint to a respective portable biometric device, which is like a remote control or, alternatively, something as inconspicuous as a pendant. After comparing the captured biometric information with biometric data stored in the device an authorization signal is transmitted, for example via infrared transmission, to a receiving port of the security system if the comparison result is indicative of a match. Upon receipt of the authorization signals from the 3 employees a processor of the locking mechanism of the security system determines access privileges for the subset 3 bank employees. After successful determination of the access privileges the door to the vault is unlocked. Further flexibility is added to the security system by defining different subsets of different bank employees for accessing different areas of the vault. For example, after the main door to the vault there are several door a for accessing different sections of the vault such as customers safety deposit boxes, different rooms for storing money, gold, documents, etc. The security system according to the invention ensured that only subsets of persons assigned to the tasks in a predefined room are able to access the same. Furthermore, the security system is expanded to enable access by a subset only at a predetermined time. For instance, one subset is enabled to access only during the morning work hours while another subset is enabled to access only during the afternoon work hours.

Figure 3:
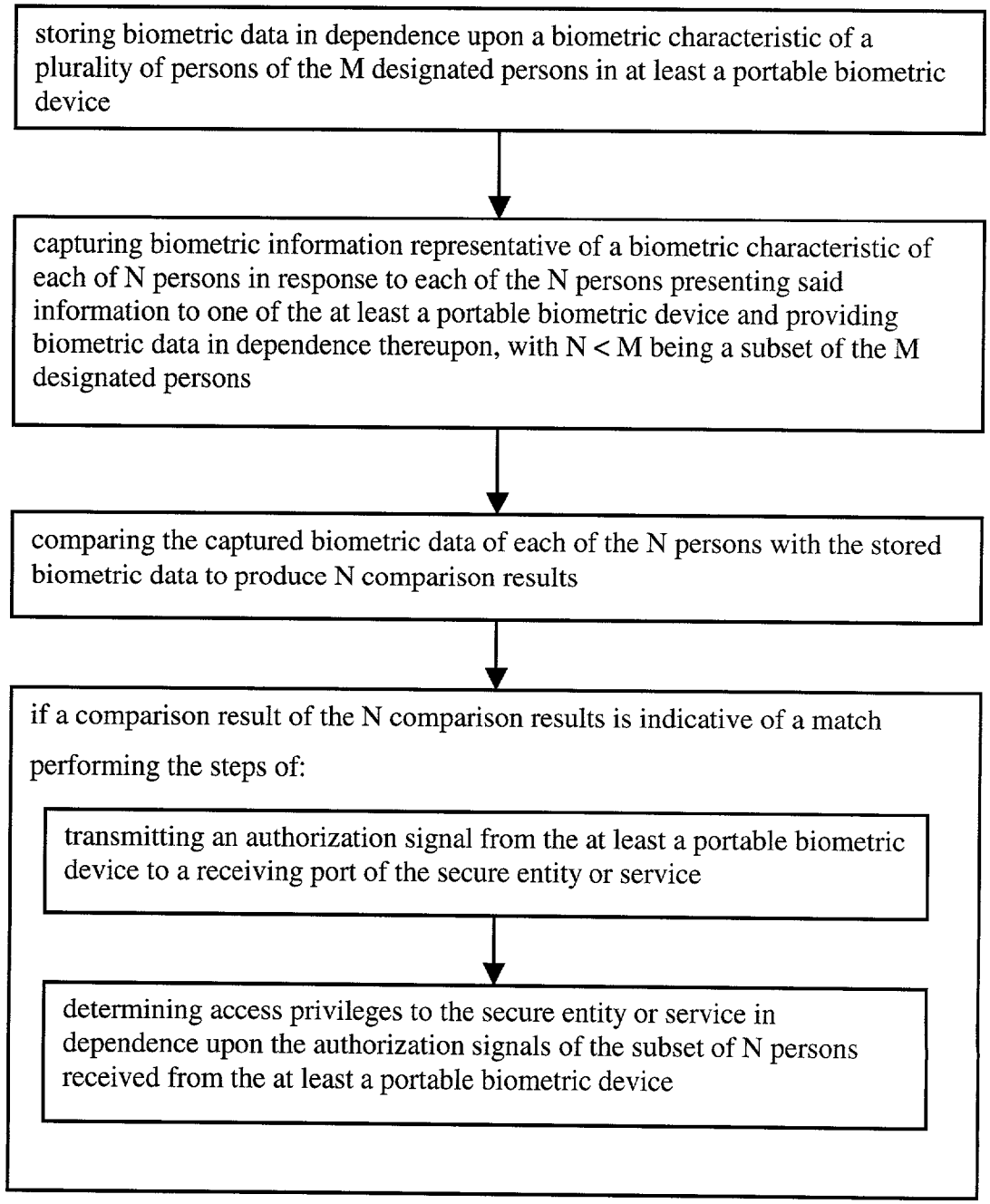

Referring to FIG. 3 a simplified flow diagram of another method of operation according to the invention of the security system 100 is shown. Biometric data in dependence upon a biometric characteristic of a plurality of persons of the M designated persons is stored in a portable biometric device. Preferably, biometric data of a subset of N persons is stored in each portable biometric device provided to the persons of the subset. This provides more flexibility, allowing use of another person's portable biometric device. Or even the whole subset of N persons is able use one portable biometric device to get access to the secure entity or service. For example, if the portable biometric device is a smart card one person of the subset inserts his smart card and all N persons of the subset provide their fingerprint to the same smart card. Upon receipt each fingerprint is captured and biometric data independence thereupon is provided to the processor of the smart card where it is compared with the biometric data stored in memory to produce a comparison result. If a comparison result is indicative of a match an authorization signal is transmitted to a receiving port of the secure entity or service. Upon receipt of the N authorization signals access privileges are determined using a processor of the locking mechanism of the secure entity or service. Preferably, different authorization signals associated with different persons are provided if a comparison result is indicative of a match.

The security system according to the invention and the methods of operating it are highly advantageous in all applications where the presence of a plurality of designated persons is required. Such applications are found in the access of hazardous areas or access and handling of hazardous materials in industry or research, requiring a predetermined number of persons to be on site for safety reasons. Other applications are found in areas where security is a concern requiring the presence of a plurality of persons to reduce the risk of theft or tampering with data or devices. For instance, of such security concerns are accesses to a bank vaults, armored vehicles, computer networks and databases. In all these applications the invention provides a very secure and flexible biometric security system ensuring access by only the predetermined subset of designated persons. This is not possible using conventional systems such as keys or password systems, which have to rely at least in part on the honesty of the persons using such a system.

Numerous other embodiments of the invention will be apparent to persons skilled in the art without departing from the spirit and scope of the invention as defined in the appended claims.

What is claimed is:

1. A method for providing access to a secure entity or service by M designated persons having only limited access privileges, comprising:

storing biometric data in dependence upon a biometric characteristic of each of the M designated persons;

capturing biometric information representative of a biometric characteristic of each of N persons and providing biometric data in dependence thereupon, with 1<N<M being a subset of a plurality of predetermined subsets of the M designated persons, wherein at least two of the predetermined subsets of the plurality of predetermined subsets of the M designated persons have different access privileges, once authenticated, to the secure entity or service;

comparing the captured biometric data of each of the N persons of the subset with the stored biometric data to produce N comparison results; and, if the N comparison results are indicative of the N persons of the subset each being one of the M designated persons and thereby forming the subset of the N persons, determining the access privileges to the secure entity or service in dependence upon the subset of the N persons.

2. A method for providing access to a secure entity or service by M designated persons having only limited access privileges as defined in claim 1, wherein another subset of the at least two predetermined subsets of the M designated persons is any set of X designated persons, N being a predetermined number and X being greater than or equal to N.

3. A method for providing access to a secure entity or service by M designated persons having only limited access privileges as defined in claim 2, wherein each subset of the plurality of predetermined subsets of the M designated persons comprises a different combination of persons of the M designated persons.

4. A method for providing access to a secure entity or service by M designated persons having only limited access privileges as defined in claim 3, wherein different subsets of the plurality of predetermined subsets of the M designated persons comprise a different number of persons combined in each subset.

5. A method for providing access to a secure entity or service by M designated persons having only limited access privileges, comprising:

providing each designated person of the M designated persons with a portable biometric device operable to capture biometric information presented thereto;

assigning a biometric characteristic of each of the M designated persons to a respective portable biometric device and storing biometric data in the respective portable biometric device in dependence upon the biometric characteristic;

capturing biometric information representative of a biometric characteristic of each of N persons in response to each of the N persons presenting said information to the respective portable biometric device and providing biometric data in dependence thereupon, with 1<N<M being a subset of a plurality of predetermined subsets of the M designated persons, wherein at least two of the subsets of the plurality of predetermined subsets have different access privileges, once authenticated, to the secure entity or service;

comparing the captured biometric data with biometric data stored in each of the respective portable biometric devices to produce a comparison result and, in dependence thereon, performing one of transmitting an authorization signal from said portable biometric device to a receiving port of the secure entity or service and other than transmitting an authorization signal from said portable biometric device; and, determining the access privileges to the secure entity or service in dependence upon the authorization signals received from the respective portable biometric devices of the subset of N persons.

6. A method for providing access to a secure entity or service by a designated person having only limited access privileges as defined in claim 5, comprising:

denying access to the secure entity or service in absence of at least N of M authorization signals.

7. A method for providing access to a secure entity or service by a designated person having only limited access privileges as defined in claim 5, wherein the subset of N persons comprises at least two persons of the M designated persons.

8. A method for providing access to a secure entity or service by M designated persons having only limited access privileges, comprising:

storing biometric data in dependence upon a biometric characteristic of each of the M designated persons in at least a portable biometric device;

capturing biometric information representative of a biometric characteristic of each of N persons in response to each of the N persons presenting said information to one of the at least a portable biometric device and providing biometric data in dependence thereupon, with 1<N<M being a subset of a plurality of predetermined subsets of the M designated persons, wherein at least two of the subsets of the plurality of predetermined subsets have different access privileges, once authenticated, to the secure entity or service;

comparing the captured biometric data of each of the N persons of the subset with the stored biometric data to produce N comparison results;

if each of X comparison results is indicative of one of the N persons being one of the M designated persons, transmitting an authorization signal from the at least a portable biometric device to a receiving port of the secure entity or service, where 1<X<N; and, determining the access privileges to the secure entity or service in dependence upon the authorization signals of the subset of X persons received from the at least a portable biometric device.

9. A method for providing access to a secure entity or service by M designated persons having only limited access privileges as defined in claim 8, wherein the determined access privileges define a time limitation.

10. A method for providing access to a secure entity or service by M designated persons having only limited access privileges as defined in claim 8, wherein the determined access privileges define functional limitations of the secure entity or service in dependence upon the subset of X persons.

11. A method for providing access to a secure entity or service by M designated persons having only limited access privileges as defined in claim 8, wherein X=N.

12. A security system for securing an entity or a service from indiscriminate access and for providing access to a subset of N persons of M designated persons, comprising:

at least a portable biometric device, the device comprising:

a biometric sensor for capturing biometric information representative of a biometric characteristic in response to a person presenting said information to the biometric sensor;

an encoder for digitally encoding the captured biometric information and providing biometric data in dependence thereupon;

memory for storing biometric data of at least one of the M designated persons;

a processor for comparing the captured biometric data with stored biometric data of a designated person to produce a comparison result and, if the comparison result is indicative of a match, for providing an authorization signal; and, a transmitter for transmitting the authorization signal;

at least a port for receiving authorization signals of the subset of 1<N<M persons from the at least a portable biometric device; and, a processor for determining access privileges to the secured entity or service in dependence upon the authorization signals of the subset of 1<N<M persons with the subset of 1<N<M persons being a subset of a plurality of predetermined subsets of the M designated persons, wherein at least two of the subsets of the plurality of predetermined subsets have different access privileges, once authenticated, to the secure entity or service.

13. A security system for securing an entity or a service from indiscriminate access as defined in claim 12, wherein the biometric sensor comprises a fingerprint imager.

14. A security system for securing an entity or a service from indiscriminate access as defined in claim 12, wherein the transmitter comprises transmission elements for wireless communication.

15. A security system for securing an entity or a service from indiscriminate access as defined in claim 12, wherein the portable biometric device comprises a handheld portable biometric device.

16. A security system for securing an entity or a service from indiscriminate access as defined in claim 15, wherein the handheld portable biometric device comprises a smart card.

* * * * *

UNITED STATES PATENT AND TRADEMARK OFFICE
CERTIFICATE OF CORRECTION

| | | |
|---|---|---|
| PATENT NO. | : 7,111,174 B2 | Page 1 of 1 |
| APPLICATION NO. | : 09/940795 | |
| DATED | : September 19, 2006 | |
| INVENTOR(S) | : Larry Hamid | |

It is certified that error appears in the above-identified patent and that said Letters Patent is hereby corrected as shown below:

Column 2,
Line 54, delete "Ludvilc (Gyergyek," and insert -- Ludvik Gyergyek, --.
Line 55, delete "Regstration," " and insert -- Registration, --.

Column 8,
Line 1, delete "several door a for accessing" and insert -- several doors for accessing --.

Signed and Sealed this

Twenty-fourth Day of April, 2007

JON W. DUDAS
*Director of the United States Patent and Trademark Office*